Sept. 15, 1953　　　　　　　O. WITTEL　　　　　　　2,651,965
SHUTTER-GOVERNOR ASSEMBLY FOR MOTION-PICTURE APPARATUS
Filed Feb. 10, 1951　　　　　　　　　　　　　　　　2 Sheets-Sheet 1
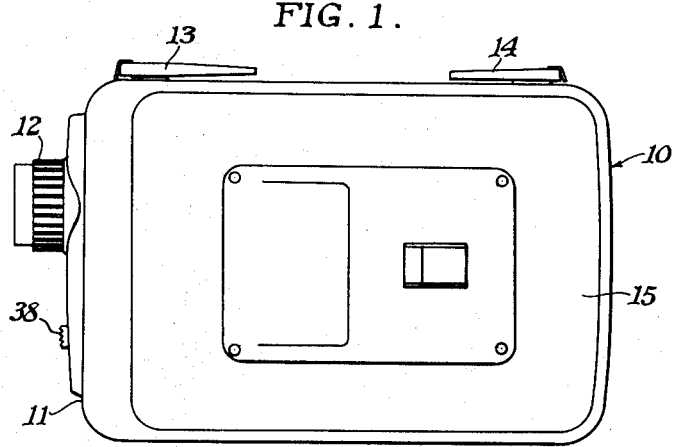
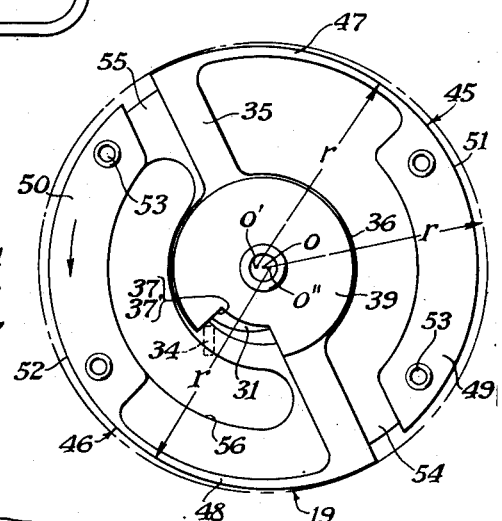
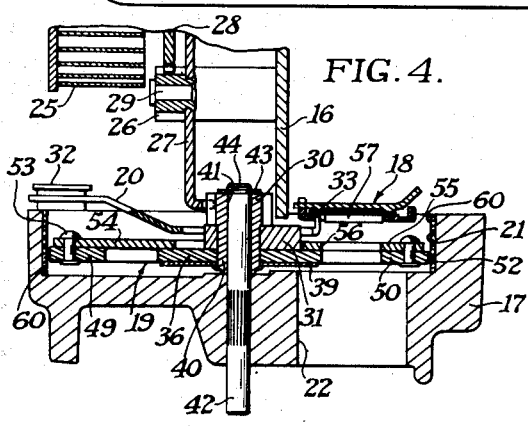
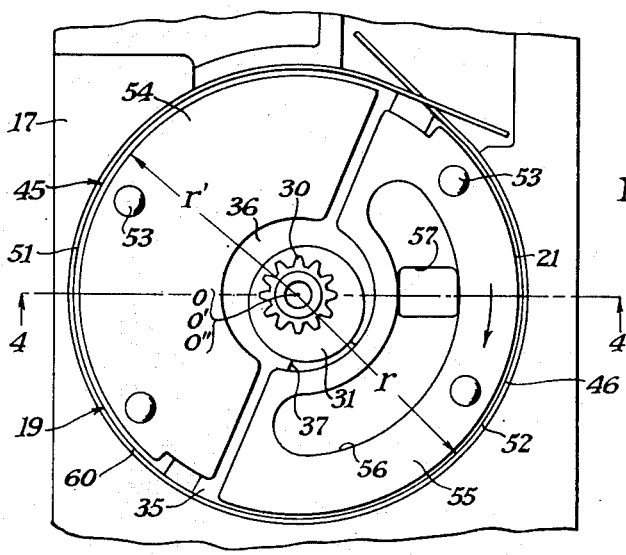
OTTO WITTEL
INVENTOR
BY
ATTORNEY & AGENT Sept. 15, 1953  O. WITTEL  2,651,965
SHUTTER-GOVERNOR ASSEMBLY FOR MOTION-PICTURE APPARATUS
Filed Feb. 10, 1951  2 Sheets-Sheet 2

OTTO WITTEL
INVENTOR
BY
ATTORNEY & AGENT

Patented Sept. 15, 1953

2,651,965

UNITED STATES PATENT OFFICE 2,651,965

SHUTTER-GOVERNOR ASSEMBLY FOR MOTION-PICTURE APPARATUS

Otto Wittel, Rochester, N. Y., assignor to Eastman Kodak Company, Rochester, N. Y., a corporation of New Jersey Application February 10, 1951, Serial No. 210,325

6 Claims. (Cl. 88—17)

This invention relates to motion picture apparatus and more particularly to a combined speed control device and shutter therefor and to a method of balancing and truing such a control device.

As is well known, motion picture apparatus and particularly motion picture cameras are operated at a standard speed. To maintain a uniform speed of the film-advancing mechanism, which is usually driven by a spring motor, a governor is connected to the mechanism to insure maintenance of the desired uniform speed. In the present invention, a governor and shutter are combined into a single unit or assembly and rotatably mounted in a recess in front of the film plane. The shutter-governor is provided with resilient arms which are flexed outwardly upon rotation of the assembly so that the peripheral surfaces of the arms will engage a friction material lining the wall of the recess to control the speed of the film-advancing mechanism. Since the shutter-governor assembly is a single unit, it can very readily be balanced and the peripheral surfaces of the arms can be reduced or trued to the diameter of the recess which defines the controlling speed.

The primary object of the invention, therefore, is to provide a speed control device and shutter for motion picture apparatus in which the two devices are combined to provide a single compact assembly.

Another object of the invention is to provide a shutter-governor assembly for motion picture apparatus in which the assembly is mounted within a cylindrical recess and the peripheral surfaces of the resilient arms of the assembly engage the walls of the recess to control the speed of the film-advancing mechanism.

Yet another object of the invention is to provide a shutter-governor assembly for motion picture apparatus in which circular segmental weights are secured to each of the two resilient arms of the assembly, one of the weights being provided with a shutter opening, and which cause the arms to flex outwardly when the assembly is rotated so that the peripheral surfaces of the arms engage the walls of the recess in which said assembly is mounted for controlling the speed of the film-advancing mechanism.

And another object of the invention is to provide a method by which the shutter-governor assembly is balanced and the peripheral surfaces of the resilient arms of said assembly are reduced to a predetermined diameter to insure proper functioning of the assembly at the desired and predetermined speed when assembled in the apparatus.

These and other objects and advantages will be apparent to those skilled in the art by the description which follows.

The objects of the invention are embodied in a shutter-governor assembly for motion picture cameras. In the illustrated embodiment of the invention, the camera is provided with a mechanism supporting frame having a cylindrical recess and an aperture aligned with the lens or objective. The shutter-governor assembly is rotatably mounted within the recess and operatively connected to the film-advancing mechanism. The shutter-governor assembly comprises a diametrical cross bar having arcuate resilient arms integral with opposite ends of said bar and extending in opposite directions therefrom. A circular segmental weight is secured to each of said arms, one of said weights being provided with a shutter opening adapted to be aligned with the aperture in the supporting frame. Upon rotation of the assembly, the weights, due to centrifugal force, flex the arms outwardly thereby causing the peripheral surfaces of the arms to engage a friction material lining the wall of said recess to control the speed of the advancing mechanism.

Reference is now made to the accompanying drawings wherein like reference numerals designate like parts and wherein:

Fig. 1 is a side elevation of a motion picture camera embodying the invention;

Fig. 2 is a rear view of the shutter-governor assembly and showing the arms in their normal position with respect to the diameter at which said arms function to control the drive mechanism;

Fig. 3 is a front elevation of the shutter-governor assembly positioned in the recess and showing the arms in their controlling position in which position the arms are in engagement with a friction material lining the wall of the recess;

Fig. 4 is a sectional view taken substantially on the line 4—4 of Fig. 3;

Figure 5:
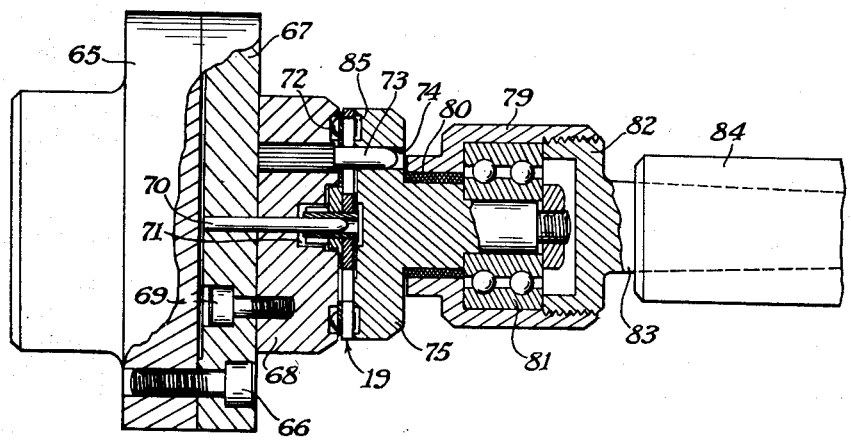
Fig. 5 is a horizontal section through an arrangement of elements for mounting, rotating and clamping the shutter-governor assembly to balance the assembly and reduce and/or true the peripheral surfaces of the arms to a predetermined diameter.
Figure 6:
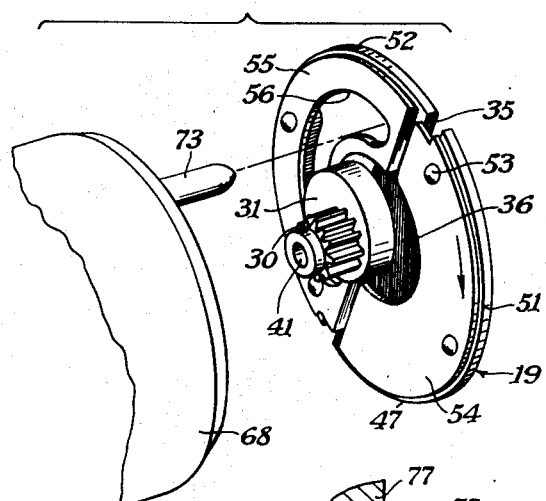
Fig. 6 is a perspective view of the driving sleeve and shutter-governor assembly and showing the drive pin for engaging the diametrical cross bar to rotate the assembly.
Figure 7:
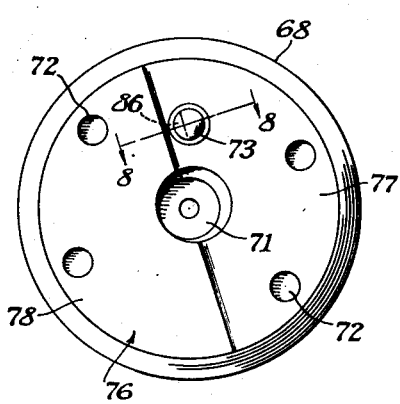
Fig. 7 is a front elevation of the driving sleeve and showing the relative position of the driving pin and the recesses therein and the two engaging surfaces forming the face thereof.

In the illustrated embodiment of the invention, the camera 10 is of the type designed for use in the hand. Such a camera comprises a casing 11 provided with a suitable objective contained in mount 12 and a finder comprising front element 13 and rear element 14. The side cover 15 is removable to permit access to the film chamber and the other side is provided with a similar cover to permit access to the mechanism which is separated from the film chamber by plate 16, as shown in Fig. 4. The forward end of the camera carries a mechanism supporting frame 17 for supporting the film gate 18, the shutter-governor assembly 19, the film-advancing claw 20, the shutter release mechanism, etc., as is well known in the art. The frame 17 is also provided with recess 21 and aperture 22 into which mount 12 extends.

The film-advancing means, as shown in Fig. 4, comprises a spring motor 25 which drives gear 26 secured integral with the crown gear 27 by means of gear 28, both of said gears 26 and 27 being rotatably mounted on shaft 29. Gear 27 meshes with pinion 30 secured to and forming a part of the shutter-governor assembly 19 together with eccentric 31. Film-advancing claw 20 is provided with an elongated aperture which engages eccentric 31, is pivotally mounted on frame 17 at 32, and has a film-engaging portion 33 extending through an aperture in film gate 18 in a well-known manner. The structure described thus far is equivalent to that found in most motion picture cameras and is illustrative of one type of mechanism to which the invention may be applied for control purposes.

The shutter-governor assembly 19 comprises a diametrical cross bar 35 having an enlarged center portion 36 which has a notch 37 therein for arresting the assembly upon movement of release button 38 in an upward direction to move lug 34 into the path of said notch, as shown in Fig. 2. A thin and circular hardened plate 39 has a notch 37' congruent in shape to notch 37 in portion 36 and is secured thereunder, as shown in Fig. 4, to prevent lug 34 from deforming notch 37 as it abuts thereagainst. Plate 39, cross bar 35, and eccentric 31 are provided with suitable apertures to receive shank 40 of pinion 30 and are maintained in position thereon between the underside of the teeth of said pinion and the formed over end of shank 40. Pinion 30 is provided with aperture 41 to receive shaft 42 anchored in frame 17 and is maintained thereon by spring washer 43 which engages groove 44 in the end of shaft 42. At opposite ends of bar 35 arms 45 and 46 extend in opposite directions, said arms comprising resilient portions 47 and 48, respectively, which are integral with cross bar 35 at one end thereof and integral at the other end with weight-supporting portions 49 and 50, respectively, the portions 49 and 50 terminating near opposite ends of bar 35. As will be noted from Fig. 2, the peripheral surfaces 51 and 52 of arms 45 and 46, respectively, are substantially semicircular about centers O' and O'', respectively, said centers not being coincident with the center of rotation O of the assembly when the assembly is in its normal or arrested position. Secured to portions 49 and 50 by rivets 53 are weights 54 and 55 which are circular segments relieved at the center to provide clearance around the eccentric 31 and which have an outer radius r' about centers O' and O'' which is smaller than radius r of arms 45 and 46. Weight 55 is provided with shutter aperture 56 which, upon rotation of assembly 19, is aligned with aperture 22 in frame 17 and aperture 57 in film gate 18. Since weight 55 is provided with a relatively large aperture, this weight is thicker than weight 54 to compensate for the aperture.

Before making an exposure, the spring motor 25 is wound or tensioned by a handle not shown and is prevented from advancing film by lug 34 in the path of notch 37. When release button 38 is moved vertically downward, lug 34 is moved out of the path of notch 37 and motor 25 through gears 28, 26, and 27 drives pinion 40 in a clockwise direction, as viewed from Fig. 3. The eccentric 31, therefore, oscillates claw 20 to intermittently advance the film strip past aperture 57, and aperture 56 is rotated past aperture 57 to permit exposure of the film strip. It is understood, of course, that the position of eccentric 31 with respect to aperture 56 is such that the film strip is stationary during the movement of aperture 56 past aperture 57. As the speed of assembly 19 increases, the centrifugal force acting on weights 54 and 55 will cause resilient portions 47 and 48 to flex, thereby causing arms 45 and 46 to move outwardly toward recess 21. At the normal operating speed of the film-advancing mechanism, the peripheral surfaces 51 and 52 of the arms 45 and 46 will engage the walls of recess 21 and prevent spring motor 25 from driving the mechanism at a higher speed. When this condition is attained, the centers O, O' and O'' will coincide, as shown in Fig. 3. To prevent excessive wear, more positive braking action and quiet operation, a strip of friction or braking material 60 is placed within recess 21 and against the wall thereof, as shown in Figs. 3 and 4. Such a friction material may be of cork, leather or a plastic material. In the present instance, it was found that a strip of cellulose acetate film base provided the best results. The radius r, when such a material is used, should be equal to the distance from the center O to the inside surface of the braking strip 60, as indicated by the broken line in Fig. 2.

Figure 8:
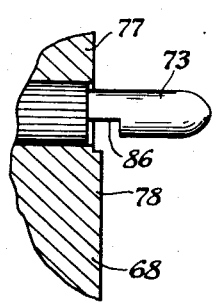
Fig. 8 is a partial sectional view taken on line 8—8 of Fig. 7 and showing the relation of the depth of the slot in the driving pin to the offset surfaces forming the face of the driving sleeve.

The shutter-governor assembly just described lends itself very readily to a simple method of balancing said assembly and, at the same time, truing peripheral surfaces 51 and 52 of arms 45 and 46 to insure proper engagement of said surfaces with brake lining 60 or the wall of recess 21. In Figs. 5–8 one form of apparatus is disclosed for the balancing and truing of the shutter-governor assembly hereinbefore described. Chuck plate 65 is screwed onto the spindle of a lathe or some other driving device which can be rotated at the controlling speed at which the assembly 19 is to function. Secured to plate 65 by screws 66 is a mounting plate 67 to which the driving plate 68 is secured by screws 69. Plate 67 carries a spindle 70 which extends through a suitable aperture in plate 68 for receiving assembly 19, and plate 68 is provided with a recess 71 for pinion 30 and eccentric 31 and with recesses 72 for receiving the heads of rivets 53. Secured to plate 68 is the driving pin 73 which is positioned thereon to extend through aperture 56 of assembly 19 and engage aperture 74 in clamping sleeve 75. Since weights 54 and 55 are of different thicknesses, the face 76 of plate 68 comprises two surfaces, a surface 77 which engages weight 55 and a surface 78 which is above surface 77 and which engages weight 54, as shown in Fig. 8. Clamping sleeve 75 is rotatably mounted within sleeve 79 by means of bearing 80 and ball bearing 81, bearing 81 being retained in position by ring 82 which is integral with the tapered shank 83 mounted in the tailstock 84 of the lathe. Recesses 85 are provided in the face of sleeve 75 to receive the turned over ends of rivets 53.

To balance and true assembly 19, the assembly is mounted on spindle 79 with pinion 30 and eccentric 31 entering recess 71, driving pin 73 extending through aperture 56 and rivets 53 aligned with the recesses 72. The assembly is moved axially along spindle 70 until surfaces 77 and 78 abut their respective weight members 55 and 54. In this position the pin 73 will abut cross bar 35 to drive the assembly in the direction indicated in Fig. 6. To permit weight 55 to flex arm 48 outwardly and to insure engagement of cross bar 35 by pin 73, pin 73 is provided with notch 86, see Fig. 8. After the assembly 19 has been properly positioned on spindle 70, tail-stock 84 is moved toward the assembly with aperture 74 of sleeve 75 aligned for receiving pin 73 and the recesses 85 aligned for receiving rivets 53 and is stopped in a position in which the face of sleeve 75 is spaced from assembly 19 by a very small amount. Chuck plate 65, plate 67 and driving plate 68 are then rotated at a speed equivalent to the controlling speed of assembly 19, the rotary motion of these parts being transmitted to assembly 19 and clamping sleeve 75 by driving pin 73. When the arms 47 and 48 are in their extended or controlling position, the tail-stock 84 is moved axially so that the face of sleeve 75 engages cross bar 35, the weight supporting portions 49 and 50 and the arms 47 and 48 to clamp these parts together with weights 54 and 55 against surfaces 77 and 78 of plate 68. Sleeve 68, assembly 19, and sleeve 75 will then be rotated as a unit and at the controlling speed. A cutting tool is then moved radially toward the moving peripheral surfaces 51 and 52 of arms 47 and 48 and the excess of material between said tool and the predetermined diameter of said surfaces is removed, thereby insuring that said surfaces will uniformly engage the brake lining 60 at the controlling speed when assembled in the camera.

In instances when one arm or weight is slightly heavier than the other, that arm will flex outwardly farther than the other and necessitate removal of more material, thereby insuring that the assembly is balanced. On the other hand, if the cutting tool is moved radially to the predetermined diameter and neither arm is contacted by the tool, such an assembly can be readily rejected, since it will not function to control at the predetermined speed. While reference has been made to moving a cutting tool toward the assembly, it is to be understood that truing of said peripheral surfaces may be accomplished by cutting, grinding, filing or in any other manner once the excess of material over the predetermined diameter has been determined.

While the present invention has been disclosed and described in detail with respect to controlling motion picture film apparatus, it will be apparent to those skilled in the art that the invention may be applied to other apparatus without departing from the invention, the scope of which is pointed out in the appended claims.

Having now particularly described my invention, what I desire to secure by Letters Patent of the United States and what I claim is:

1. In motion picture apparatus having a mechanism supporting frame provided with an aperture and a cylindrical recess, said aperture being within the circular area defined by said recess and in the bottom wall thereof, the combination comprising means for advancing a film strip past said aperture, and a shutter-governor assembly rotatably mounted within said recess and operatively connected to said advancing means and including a diametrical cross bar having resilient arcuate arms integral therewith and extending from each end thereof in opposite directions, and circular segmental members secured to each of said arms, one of said members being provided with a shutter opening adapted to be aligned with said aperture for intermittently exposing said film strip to the light entering said aperture, and adapted upon rotation of said assembly to flex said arms outwardly whereby the peripheral surfaces of said arms engage said recess to control the speed of said advancing means.

2. In motion picture apparatus having a mechanism supporting frame provided with an aperture and a cylindrical recess, said aperture being within the circular area defined by said recess and in the bottom wall thereof, the combination comprising means for advancing a film strip past said aperture, and a shutter-governor assembly rotatably mounted within said recess and operatively connected to said advancing means and including a diametrical cross bar having resilient arcuate arms integral therewith and extending from each end thereof in opposite directions, said arms being adapted to be flexed from a normal position to a position in which the peripheral surfaces thereof form circular arcs having a radius substantially equal to that of said recess, and circular segmental members secured to each of said arms, one of said members being provided with an arcuate shutter opening adapted to be aligned with said aperture for intermittently exposing said film strip to the light entering said aperture, and adapted upon rotation of said assembly to flex said arms outwardly whereby said peripheral surfaces engage said recess to control the speed of said advancing means.

3. In motion picture apparatus having a mechanism supporting frame provided with an aperture and a cylindrical recess, said aperture being within the circular area defined by said recess and in the bottom wall thereof, the combination comprising means for advancing a film strip past said aperture, and a shutter-governor assembly rotatably mounted within said recess and operatively connected to said advancing means and including a diametrical cross bar having resilient arms, said arms having free ends spaced from said bar and the other ends of said arms integral with said bar at opposite ends thereof and each arm having its peripheral surface formed substantially semi-circular about a center other than the center of rotation of said assembly, and circular segmental members secured to each of said arms, one of said members being provided with an arcuate shutter opening adapted to be aligned with said aperture for intermittently exposing said film strip to the light entering said aperture, and adapted upon rotation of said assembly to flex said arms outwardly whereby the centers of said peripheral surfaces coincide with the center of rotation of said assembly and said peripheral surfaces engage said recess to control the speed of said advancing means.

4. In motion picture apparatus having a mechanism supporting frame provided with an aperture and a cylindrical recess, said aperture being within the circular area defined by said recess and in the bottom wall thereof, the combination comprising means for advancing a film strip past said aperture, and a shutter-governor assembly rotatably mounted within said recess and operatively connected to said advancing means and including a diametrical cross bar having weight supporting members on opposite sides thereof and resilient arms integral with one end of said weight supporting members and opposite ends of said bar, said arms and members having continuous peripheral surfaces formed substantially semi-circular about centers other than the center of rotation of said assembly, and a circular segmental weight secured to each of said weight supporting members, one of said weights being provided with an arcuate shutter opening adapted to be aligned with said aperture for intermittently exposing said film strip to the light entering said aperture, and adapted upon rotation of said assembly to flex said resilient arms outwardly whereby the centers of said peripheral surfaces coincide with the center of rotation of said assembly and said peripheral surfaces engage said recess to control the speed of said advancing means.

5. In motion picture apparatus having a mechanism supporting frame provided with an aperture and a cylindrical recess, said aperture being within the circular area defined by said recess and in the bottom wall thereof, the combination comprising means for advancing a film strip past said aperture, a friction material within said recess for providing a brake lining around the wall of said recess, and a shutter-governor assembly rotatably mounted within said recess and operatively connected to said advancing means and including a diametrical cross bar having resilient arcuate arms integral therewith and extending from each end thereof in opposite directions, and circular segmental weights secured to each of said arms, one of said weights being provided with an arcuate shutter opening adapted to be aligned with said aperture for intermittently exposing said film strip to the light entering said aperture, and adapted upon rotation of said assembly to flex said arms outwardly whereby the peripheral surfaces of said arms engage said friction material to control the speed of said advancing means.

6. In motion picture apparatus having a mechanism supporting frame provided with an aperture and a cylindrical recess, said aperture being within the circular area defined by said recess and in the bottom wall thereof, the combination comprising means for advancing a film strip past said aperture, a strip of thermoplastic material within said recess for providing a brake lining around the wall thereof, and a shutter-governor assembly rotatably mounted within said recess and operatively connected to said advancing means and including a diametrical cross bar having resilient arms, said arms having free arms spaced from said bar and the other ends of said arms integral with said bar at opposite ends thereof and each arm having its peripheral surface formed substantially semi-circular about a center other than the center of rotation of said assembly, and circular segmental weights secured to each of said arms, one of said weights being provided with an arcuate exposure aperture adapted to be aligned with said aperture for intermittently exposing said film strip to the light entering said aperture, and adapted upon rotation of said assembly to flex said arms outwardly whereby the centers of said peripheral surfaces coincide with the center of rotation of said assembly and said peripheral surfaces engage said brake lining to control the speed of said advancing means.

OTTO WITTEL.

References Cited in the file of this patent

UNITED STATES PATENTS

| Number | Name | Date |
|---|---|---|
| 1,326,409 | McMillan | Dec. 30, 1919 |
| 1,518,562 | Claybourn | Dec. 9, 1924 |
| 1,544,521 | Sosa | June 30, 1925 |
| 1,661,741 | Tierney | Mar. 6, 1928 |
| 1,830,567 | Shapiro | Nov. 3, 1931 |
| 2,327,606 | Saltz | Aug. 24, 1943 |
| 2,376,302 | Widmer | May 15, 1945 |

FOREIGN PATENTS

| Number | Country | Date |
|---|---|---|
| 344,513 | Great Britain | Mar. 9, 1931 |